United States Patent
Dreiling et al.

(10) Patent No.: US 11,516,732 B2
(45) Date of Patent: *Nov. 29, 2022

(54) PROVISIONING AN EMBEDDED UNIVERSAL INTEGRATED CIRCUIT CARD (EUICC) OF A MOBILE COMMUNICATION DEVICE

(71) Applicant: T-Mobile Innovations LLC, Overland Park, KS (US)

(72) Inventors: Ryan P. Dreiling, Shawnee, KS (US); Balasubramaniam Guru, Overland Park, KS (US); Rima Khurana, Overland Park, KS (US); Philip W. Uehling, Olathe, KS (US)

(73) Assignee: SPRINT COMMUNICATIONS COMPANY LP, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/333,218

(22) Filed: May 28, 2021

(65) Prior Publication Data

US 2021/0400569 A1 Dec. 23, 2021

Related U.S. Application Data

(63) Continuation of application No. 16/907,107, filed on Jun. 19, 2020, now Pat. No. 11,057,827.

(51) Int. Cl.
*H04W 4/60* (2018.01)
*H04W 48/16* (2009.01)
(Continued)

(52) U.S. Cl.
CPC ...... *H04W 48/16* (2013.01); *G06K 19/06103* (2013.01); *H04W 8/04* (2013.01);
(Continued)

(58) Field of Classification Search
CPC ....... H04W 48/16; H04W 12/35; H04W 8/20; H04W 8/205; H04W 12/40; H04W 4/60
See application file for complete search history.

(56) References Cited

U.S. PATENT DOCUMENTS 10,387,134 B2 * 8/2019 Gao .................. H04W 12/106
10,848,961 B1 * 11/2020 Larsson ............... H04W 48/16
(Continued)

FOREIGN PATENT DOCUMENTS

WO 20210257259 A1 12/2021

OTHER PUBLICATIONS

Notice of Allowance dated Mar. 10, 2021, U.S. Appl. No. 16/907,107, filed Jun. 19, 2020.
(Continued)

*Primary Examiner* — Barry W Taylor

(57) ABSTRACT

A method of provisioning an eUICC of a mobile communication device. The method comprises sending a GSMA confirm order request from an eUICC provisioning application executing on a computer system to a SM-DP+ server, wherein the confirm order comprises an ICCID and a FQDN of a discovery server; in response to receiving a GSMA confirm order response indicating a failure of the discovery server, determining by the eUICC provisioning application that a mobile communication device associated with the ICCID is configured with an LPA application that is able to complete an alternative eSIM profile provisioning process using a scanning device to capture an activation code; generating an activation code by the eUICC provisioning application that encodes an address of the SM-DP+ server and the ICCID; and sending the activation code by the eUICC provisioning application to an email account associated with a user of the mobile communication device.

20 Claims, 6 Drawing Sheets

(51) Int. Cl.
*H04W 60/04* (2009.01)
*G06K 19/06* (2006.01)
*H04W 8/06* (2009.01)
*H04W 8/04* (2009.01)
*H04W 12/40* (2021.01)
*H04W 12/30* (2021.01)
*H04W 8/20* (2009.01)

(52) U.S. Cl.
CPC ........... *H04W 8/065* (2013.01); *H04W 60/04* (2013.01); *H04W 8/20* (2013.01); *H04W 8/205* (2013.01); *H04W 12/35* (2021.01); *H04W 12/40* (2021.01)

(56) References Cited

U.S. PATENT DOCUMENTS

| | | | | |
|---|---|---|---|---|
| 11,057,827 | B1* | 7/2021 | Dreiling | H04W 60/04 |
| 2015/0287033 | A1* | 10/2015 | Page | G06Q 20/325 705/75 |
| 2018/0060199 | A1 | 3/2018 | Li et al. | |
| 2018/0131699 | A1* | 5/2018 | Park | H04W 12/08 |
| 2019/0074983 | A1 | 3/2019 | Yang et al. | |
| 2020/0092711 | A1* | 3/2020 | Chen | H04W 8/205 |
| 2020/0120494 | A1* | 4/2020 | Fares | H04W 8/26 |
| 2020/0374686 | A1* | 11/2020 | Zhang | H04L 67/30 |

OTHER PUBLICATIONS

Dreiling, Ryan P., et al., "Provisioning an Embedded Universal Integrated Circuit Card (eUICC) of a Mobile Communication Device," International Application No. PCT/US2021/34310, filed May 26, 2021.

V. Gsma, et al.: "GSM Association Non-confidential Official Document SGP.22-SGP.22 RSP Technical Specification Security Classification: Non-confidential GSM Association Non-confidential Official Document SGP.22-SGP.22 RSP Technical Specification", Jun. 5, 2020, (Jun. 5, 2020), p. 41, XP055748263, Retrieved from the Internet: URLhttps://www.gsma.com/esim/wp-content/uploads/2020/06.SGP.22-v2.2.2.pdf [retrieved on Mar. 15, 2022], p. 49-52, paragraphs 60-61, pp. 104-113, 149-151, and 209-211.

Foreign Communication From a Related Counterpart Application, International Search Report and Written Opinion dated Aug. 9, 2021, International Application No. PCT/US2021/034310 filed on May 26, 2021.

* cited by examiner

PROVISIONING AN EMBEDDED UNIVERSAL INTEGRATED CIRCUIT CARD (EUICC) OF A MOBILE COMMUNICATION DEVICE

CROSS-REFERENCE TO RELATED APPLICATIONS

This application is a continuation of and claims priority under 35 U.S.C. § 120 to U.S. patent application Ser. No. 16/907,107 filed on Jun. 19, 2020, entitled "Provisioning an Embedded Universal Integrated Circuit Card (eUICC) of a Mobile Communication Device" by Ryan P. Dreiling, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may complete an authentication process with a cell site to obtain a wireless communication link from the cell site and access to the radio access network that the cell site is a part of. This may involve the mobile communication device radio modem obtaining network access keys or network access credentials from a subscriber identity module (SIM) and providing those network access keys or network access credentials to the cell site. The SIM may be a smart card that comprises memory and a processor. SIM cards may be removable in some circumstances, for example in traditional mobile phones. By removing a first SIM card and installing a second SIM card in a mobile phone, a user may change his or her service provider network. Removable SIM cards may not be provided in some mobile communication devices, where the role of the SIM card is instead performed by an embedded universal integrated circuit card (eUICC) that may be provisioned with network access keys and/or network access credentials, with branding information, with applications, and other data artifacts. The radio modem may then obtain the network access keys or network access credentials from the eUICC and provide those network access keys or network access credentials to the cell site to obtain a wireless communication link.

SUMMARY

In an embodiment, a method of provisioning an embedded universal integrated circuit card (eUICC) of a mobile communication device is disclosed. The method comprises sending a global system for mobile communications association (GSMA) download order request by an embedded universal integrated circuit card (eUICC) provisioning application executing on a computer system to an SM-DP+ server, where the download order request comprises an embedded identity document (EID) that identifies an embedded universal integrated circuit card (eUICC) of a mobile communication device and an integrated circuit card identifier (ICCID) that identifies an eSIM profile stored on the SM-DP+ server and sending a first GSMA confirm order request by the eUICC provisioning application to the SM-DP+ server, wherein the first GSMA confirm order request comprises the ICCID and a fully qualified domain name (FQDN) of a discovery server, where the ICCID identifies an eSIM profile stored on the SM-DP+ server. The method comprises receiving a first GSMA confirm order response by the eUICC provisioning application from the SM-DP+ server, where the first GSMA confirm order response indicates a failure of the discovery server and, in response to the failure of the discovery server indicated in the first GSMA confirm order response, determining by the eUICC provisioning application that a mobile communication device associated with the ICCID has a local profile assistant (LPA) that is configured to complete an alternative eSIM profile provisioning process based on using a scanning device to capture an activation code. The method comprises, in response to determining by the eUICC provisioning application that the mobile communication device has the LPA that is configured to complete the alternative eSIM profile provisioning process, sending a second GSMA confirm order request by the eUICC provisioning application to the SM-DP+ server, wherein the second GSMA confirm order request comprises the ICCID and does not comprise the EID of the eUICC of the mobile communication device, whereby the ICCID is disassociated with the EID by the SM-DP+ server and generating an activation code by the eUICC provisioning application, where the activation code encodes an address of the SM-DP+ server and the ICCID. The method comprises sending the activation code by the eUICC provisioning application to an email account associated with a subscriber of the mobile communication device associated with the ICCID, whereby the mobile communication device is enabled to scan the activation code presented in a screen of an email application executing on a computer system associated with the user, to decode the activation code to extract the address of the SM-DP+ server and the ICCID from the activation code, to establish a data communication session with the SM-DP+ server, to provide the ICCID to the SM-DP+ server, to download the eSIM profile stored on the SM-DP+ server identified by the ICCID, and to install the eSIM profile into an eUICC of the mobile communication device.

In another embodiment, a computer system is disclosed. The computer system comprises a processor, a non-transitory memory, and an embedded universal integrate circuit card (eUICC) provisioning application stored in the non-transitory memory. When executed by the processor, the eUICC provisioning application sends a global system for mobile communications association (GSMA) confirm order request to a SM-DP+ server, wherein the confirm order comprises an ICCID and a fully qualified domain name (FQDN) of a discovery server, where the ICCID identifies an eSIM profile stored on the SM-DP+ server and receives a GSMA confirm order response from the SM-DP+ server, where the GSMA confirm order response indicates a failure of the discovery server. The eUICC provisioning application when executed, in response to the failure of the discovery server indicated in the GSMA confirm order response, determines that a mobile communication device associated with the ICCID is configured with a local profile assistant (LPA) application that is able to complete an alternative eSIM profile provisioning process based on using a scanning device to capture an activation code, and generates an activation code that encodes an address of the SM-DP+ server and the ICCID. The eUICC application sends the activation code to an email account associated with a subscriber of the mobile communication device associated with the ICCID, whereby the mobile communication device is enabled to scan the activation code presented in a screen of an email application executing on a computer system associated with the user, to decode the activation code to extract the address of the SM-DP+ server and the ICCID from the activation code, to establish a data communication session with the SM-DP+ server, to provide the ICCID to the SM-DP+ server, to download the eSIM profile stored on the SM-DP+ server identified by the ICCID, and to install the eSIM profile into an eUICC of the mobile communication device.

In yet another embodiment, a method of provisioning an embedded universal integrated circuit card (eUICC) of a mobile communication device is disclosed. The method comprises sending a global system for mobile communications association (GSMA) confirm order request from an embedded universal integrated circuit card (eUICC) provisioning application executing on a computer system to a SM-DP+ server, wherein the confirm order comprises an ICCID and a fully qualified domain name (FQDN) of a discovery server, where the ICCID identifies an eSIM profile stored on the SM-DP+ server and receiving a GSMA confirm order response by the eUICC provisioning application from the SM-DP+ server, where the GSMA confirm order response indicates a failure of the discovery server. The method comprises, in response to the failure of the discovery server indicated in the GSMA confirm order response, determining by the eUICC provisioning application that a mobile communication device associated with the ICCID is configured with a local profile assistant (LPA) application that is able to complete an alternative eSIM profile provisioning process based on using a scanning device to capture an activation code and generating an activation code by the eUICC provisioning application, where the activation code encodes an address of the SM-DP+ server and the ICCID. The method comprises sending the activation code by the eUICC provisioning application to an email account associated with a subscriber of the mobile communication device associated with the ICCID, whereby the mobile communication device is enabled to scan the activation code presented in a screen of an email application executing on a computer system associated with the user, to decode the activation code to extract the address of the SM-DP+ server and the ICCID from the activation code, to establish a data communication session with the SM-DP+ server, to provide the ICCID to the SM-DP+ server, to download the eSIM profile stored on the SM-DP+ server identified by the ICCID, and to install the eSIM profile into an eUICC of the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
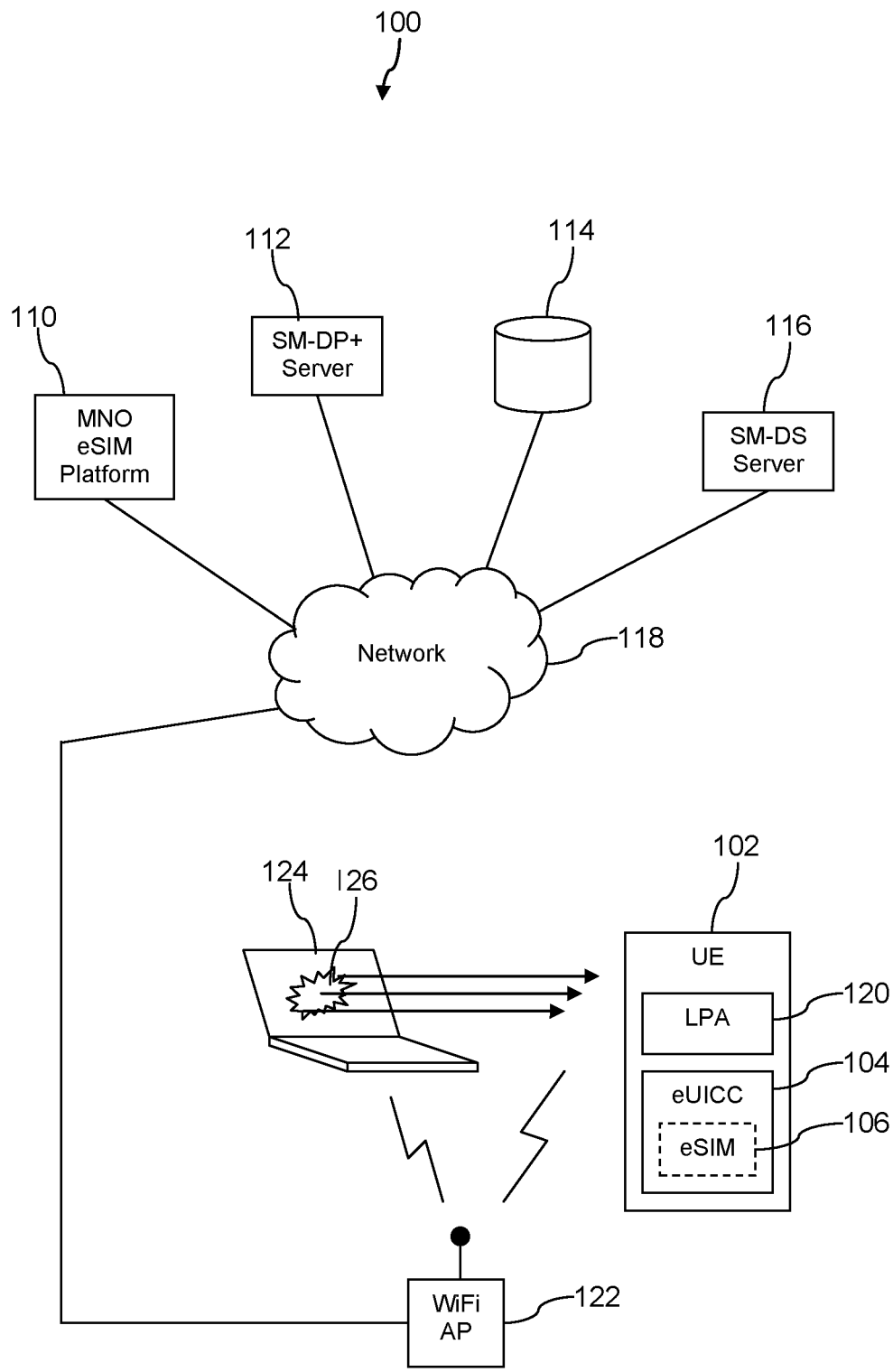
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A wireless communication device (user equipment—UE) having an embedded universal integrated circuit card (eUICC) may be provided with an electronic subscriber identity module (eSIM) profile that defines a phone number, network access keys and network access credentials, encryption keys, preferred roaming lists (PRLs), executable applications, branding content, and other data. The branding content may comprise one or more ring tones and a mobile network operator logo. The eSIM profile may be accessed by a radio modem of the UE to obtain network access credentials to provide to a cell site to obtain a wireless communication link from the cell site. The eSIM profiles may be custom built for a specific UE. The eSIM profiles may be different across different models and brands of UE. The eSIM profiles may be different for the same model and brand of UE for use with different mobile network operator's wireless communication service. Typically the eSIM profile is not installed in the UE by the manufacturer but instead is installed during device activation performed by the user.

A variety of approaches may be used to provision the eSIM profile to the UE. In a first approach, the UE may be configured with an address of an SM-DP+ server. The UE, for example a local profile assistant (LPA) of the UE, may connect to the SM-DP+ server based on the configured address, request the eSIM profile, receive the eSIM profile from the SM-DP+ server, and install the eSIM profile in the eUICC of the UE. In a second approach, the UE may be configured with an address of an SM-DS discovery server. A mobile network operator (MNO) eSIM provisioning platform requests the SM-DP+ server to register the eSIM profile to the specific UE. The SM-DP+ server registers the eSIM profile with the SM-DS discovery server and returns a response to the MNO eSIM provisioning platform. The UE reaches out to the SM-DS discovery server, and the SM-DS discovery server sends a message providing the address of the SM-DP+ server. The second approach provides a level of indirection that avoids having to hard code the address of the SM-DP+ server into the UE. The UE, for example the LPA, then may connect to the SM-DP+ server based on the address provided to it by the SM-DS server, request the eSIM profile, receive the eSIM profile from the SM-DP+ server, and install the eSIM profile in the eUICC of the UE. In a third approach, an activation code may be encoded with the address of the SM-DP+ server and emailed by the MNO eSIM provisioning platform to the user. The UE may access the activation code from the email and extract the address of the SM-DP+ server. In an embodiment, the activation code may be a 2-dimensional barcode such as a quick response (QR) code, a ShotCode, a Semacode, or other 2-dimensional barcode. The 2-dimensional barcode may be presented in an email screen on a laptop of the user, and a camera of the UE may scan the 2-dimensional barcode. The UE may then process the 2-dimensional barcode to extract the activation code. The UE, for example the LPA, then may connect to the SM-DP+ server based on the address encoded in the activation code (e.g., extracted from the 2-dimensional barcode), request the eSIM profile, receive the eSIM profile from the SM-DP+ server, and install the eSIM profile in the eUICC of the UE.

These different approaches each have their weaknesses. The first approach involves hard coding the SM-DP+ server address into the UE. If the address of the SM-DP+ server later changes, as sometimes happens, the activation process may be stalled. The second approach avoids hard coding, but if the SM-DS discover server is out of service the second approach may fail. The third approach entails an undesirably high level of complexity and user involvement that may lead to an undesired reputation for activation difficulties for the subject MNO, which might repel customers from the MNO. The present disclosure teaches a hybrid approach for eSIM provisioning which relies primarily on the second approach but switches dynamically to the third approach if the second approach fails.

When the MNO eSIM provisioning platform receives a response from the SM-DP+ server that indicates that the registration by the SM-DS server of the eSIM profile to the specific UE has failed, the MNO eSIM provisioning platform detects this condition and undertakes alternative automated processing. The MNO eSIM provisioning platform first does a look up in a data store to determine the capabilities and configuration of the subject UE. The MNO eSIM provisioning platform determines if the UE is programmed or configured to complete an alternative eSIM provisioning process. In an embodiment, the MNO eSIM provisioning platform determines if the UE is configured with an LPA that is able to complete the alternative eSIM provisioning process. In an embodiment, the MNO eSIM provisioning application determines if the UE has a scanning device, for example a camera. If the MNO eSIM provisioning application determines that the UE is programmed to complete the alternative eSIM provisioning process, it encodes the address of the SM-DP+ server in an activation code and emails this to the user of the UE. The user of the UE may present the activation code in a screen of an email application on another device, for example on a laptop computer. The user scans the activation code with the camera or other scanning device of the UE. The LPA of the UE extracts the address of the SM-DP+ server and uses that address to complete the process of downloading and installing the eSIM profile.

The hybrid eSIM provisioning process taught herein is a technical solution to a technical problem. In a perfect world, a one size fits all solution would be sufficient and all the moving parts of eSIM provisioning would happen according to plan. In the real world, however, there are many technical hiccups that can and do occur, some of which are described above. Also, in the real world an eSIM provisioning process desirably is capable of interworking with a large variety of different UEs have different components and capabilities. The hybrid eSIM provisioning process taught herein provides a process—a technical solution—for the case where an SM-DS discovery server is out of service, a rare event, but yet an event which has happened in the past. The hybrid eSIM provisioning process taught herein can increase the user satisfaction by providing an alternative when the second provisioning approach does not work. Rather than having to take their mobile communication device in to a service shop or a retail store to complete the provisioning when the second provisioning approach fails, the user can complete the provisioning himself by the alternative process.

Turning now to FIG. 1, a communication system 100 is described. In an embodiment, the system 100 comprises a mobile communication device (user equipment—UE) 102 have an embedded universal integrated circuit card (eUICC) 104 that is configured to store an eSIM profile 106. In an initial condition (e.g., after purchase and before activation) the eUICC 104 may not store an eSIM profile 106. When configured with an eSIM profile 106 the UE 102 may be able to attach to a wireless communication network and establish a wireless link with a cell site based on providing network access keys and/or network access credentials read from the eUICC 104 to the cell site, for example by a radio modem of the UE 102 reading the eSIM profile 106 and communicating with the cell site. The UE 102 may be a mobile phone, a cell phone, a smart phone, a personal digital assistant (PDA), a wearable computer, a headset computer, a laptop computer, a notebook computer, or a tablet computer. The UE 102, when provisioned with the eSIM profile 106, may communicate with a cell site according to a 5G, a long term evolution (LTE), a code division multiple access (CDMA), or a global system for mobile communications (GSM) telecommunication protocol.

In an embodiment, the system 100 comprises a mobile network operator (MNO) eSIM provisioning platform 110, a SM-DP+ server 112, an eSIM data store 114, a SM-DS discovery server 116, and a network 118. The network 118 comprises one or more public networks, one or more private networks, or a combination thereof. The MNO eSIM provisioning platform 110, the SM-DP+ server 112, and the SM-DS server 116 may be implemented by computers or computer systems. The eSIM data store 114 may be implemented in part by a computer or a computer system. Computers are described further hereinafter. In an embodiment, the system 100 further comprises a WiFi access point (AP) 122 and an electronic device 124 that is able to present an activation code 126, for example a 2-dimensional barcode, on a display. The MNO eSIM provisioning platform 110, the SM-DP+ server 112, the eSIM data store 114, the SM-DS server 116, and the WiFi AP 122 are able to communicate with each other, subject to security and access restrictions, via the network 118 (e.g., access to the eSIM data store 114 may be restricted to the SM-DP+ server alone).

Figure 2:
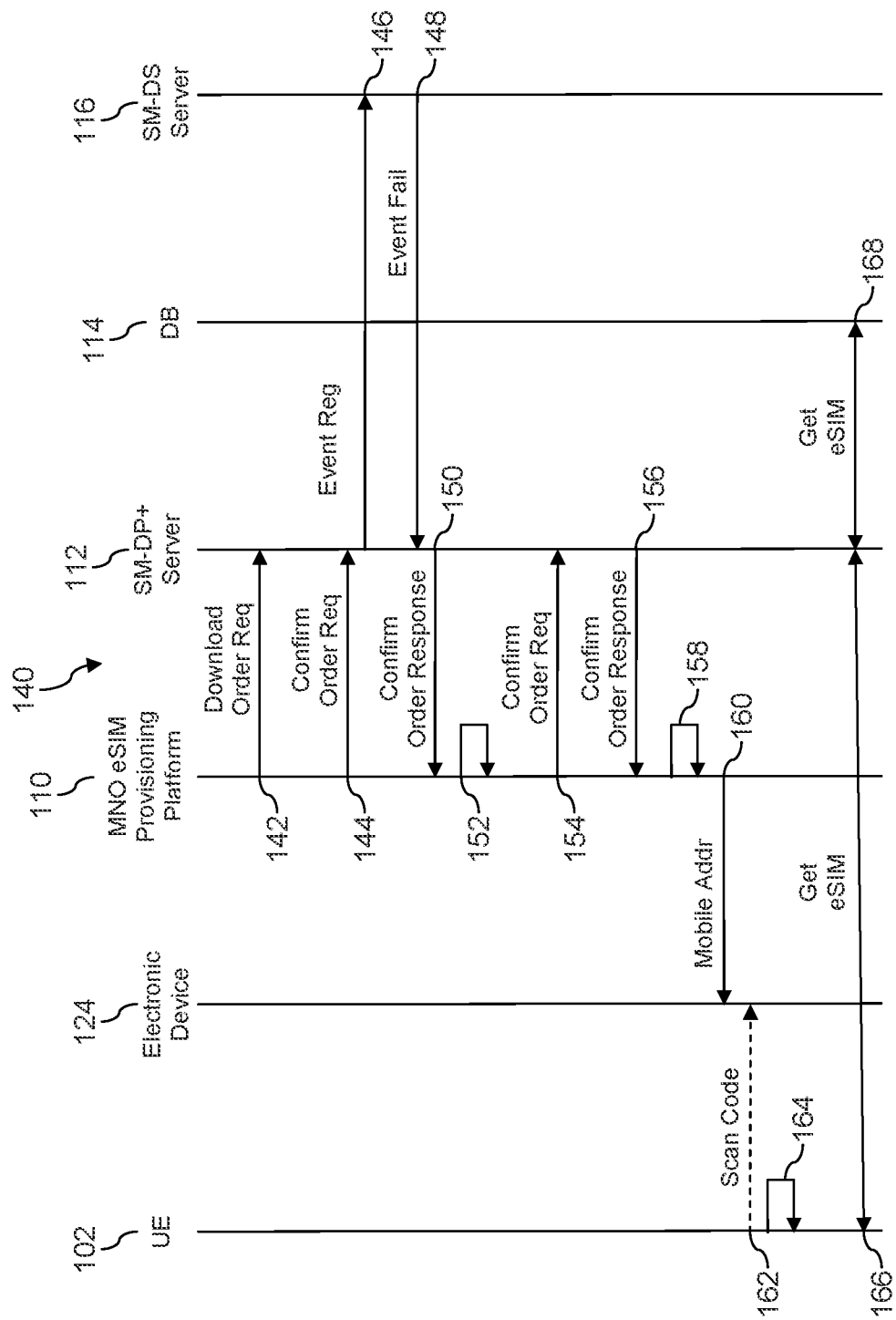
FIG. 2 is a message sequence diagram illustrating a dynamic adaptive eUICC provisioning process according to an embodiment of the disclosure.

Turning now to FIG. 2, a message sequence 140 is described. In an embodiment, the message sequence 140 may occur in the context of the UE 102 being delivered to a user who has purchased the UE 102 and for the purpose of provisioning an eSIM profile 106 to the eUICC 104 of the UE 102. The MNO eSIM provisioning platform 110, for example an eSIM provisioning application executing on the MNO eSIM provisioning platform 110, sends a global system for mobile communications association (GSMA) download order request message 142 to the SM-DP+ server 112. The download order request message 142 comprises an equipment identity (EID) uniquely identifying the eUICC 104 of the UE 102 and an integrated circuit card identifier (ICCID) that identifies the eSIM profile 106 desired to be downloaded and installed into the eUICC 104 of the UE 102. The MNO eSIM provisioning platform 110 then sends a GSMA confirm order request message 144 to the SM-DP+ server 112. In response to receiving the confirm order request message 144, the SM-DP+ server 112 sends an event registration message 146 to the SM-DS server 116. The event registration message 146 provides information about the UE 102 and/or the EID, in preparation of the LPA 120 of the UE 102 requesting the address of the SM-DP+ server 112 to complete downloading and installation of the eSIM 106. In the message sequence 140 described here, however, the SM-DS server 116 is not able to complete the event registration and sends an event fail message 148 to the SM-DP+ server 112. The SM-DP+ server 112 sends a GSMA confirm order response message 150 to the MNO eSIM provisioning platform 110. The confirm order response message 150 indicates that there has been a failure with the SM-DS server 116. It is understood that there may be other messages that occur in the message sequence 140 that are not illustrated or described here. For example, one or more of the messages may be resent, and one or more additional responses may be sent.

At label 152, the MNO eSIM provisioning platform 110 detects the failure of the SM-DS server and executes alternative processing in an attempt to dynamically adapt the eSIM provisioning process. First the MNO eSIM provisioning platform 110 may determine if the UE 102 and/or the LPA 120 supports an alternative eSIM provisioning process. The MNO eSIM provisioning platform 110 may look up device capabilities of the UE 102 and/or of the LPA 120 installed in the UE 102, for example in a data store. If the MNO eSIM provisioning platform 110 determines that the UE 102 is capable of performing the alternative eSIM provisioning process, the MNO eSIM provisioning platform 110 sends a GSMA confirm order request message 154 to the SM-DP+ server 112. The confirm order request message 154 comprises the ICCID identifying the eSIM profile 106 but does not comprise the EID. In an embodiment, in response to receiving the confirm order request message 154, the SM-DP+ server disassociates the eSIM profile 106 from the EID previously associated to it (e.g., in response to receiving download order request message 142). The SM-DP+ server 112 sends a confirm order response message 156 indicating success to the MNO eSIM provisioning platform 110.

At label 158, the MNO eSIM provisioning platform 110 generates an activation code that embeds the address of the SM-DP+ server 112 and the ICCID that identifies the eSIM profile 106. In an embodiment, the activation code may be a 2-dimensional barcode. In another embodiment, the activation code may be an encrypted message, for example a fixed length encrypted data item. The MNO eSIM provisioning platform 110 sends an activation code message 160 to the device 124. The device 124, for example a different mobile communication device or a desktop computer, may present the activation code 126 on a display. In an embodiment, the device 124 presents a 2-dimensional barcode in a display. In an embodiment, the address of the SM-DP+ server 112 is an internet protocol (IP) address. In an embodiment, the address of the SM-DP+ server 112 is a uniform resource locator (URL).

At label 162, the UE 102 scans the activation code 126 presented on the screen of the device 124. For example, a camera of the UE 102 scans the activation code 126. At label 164, the UE 102 processes the activation code to extract the data encoded in the activation code, for example to extract the address of the SM-DP+ server and the ICCID. At label 166, the UE 102 establishes a communication session with the SM-DP+ server 112 and provides the ICCID to the SM-DP+ server 112. At label 168, the SM-DP+ server 112 retrieves the eSIM profile 106 from the eSIM data store 114. The SM-DP+ server 112 returns the eSIM profile 106 to the UE 102, and UE 102 installs the eSIM profile 106 in the eUICC 104. After the eSIM profile 106 is installed in the eUICC 104, the UE 102 and/or the radio modem of the UE 102 may reboot to take cognizance of the updated eSIM profile 106.

Figure 3A:
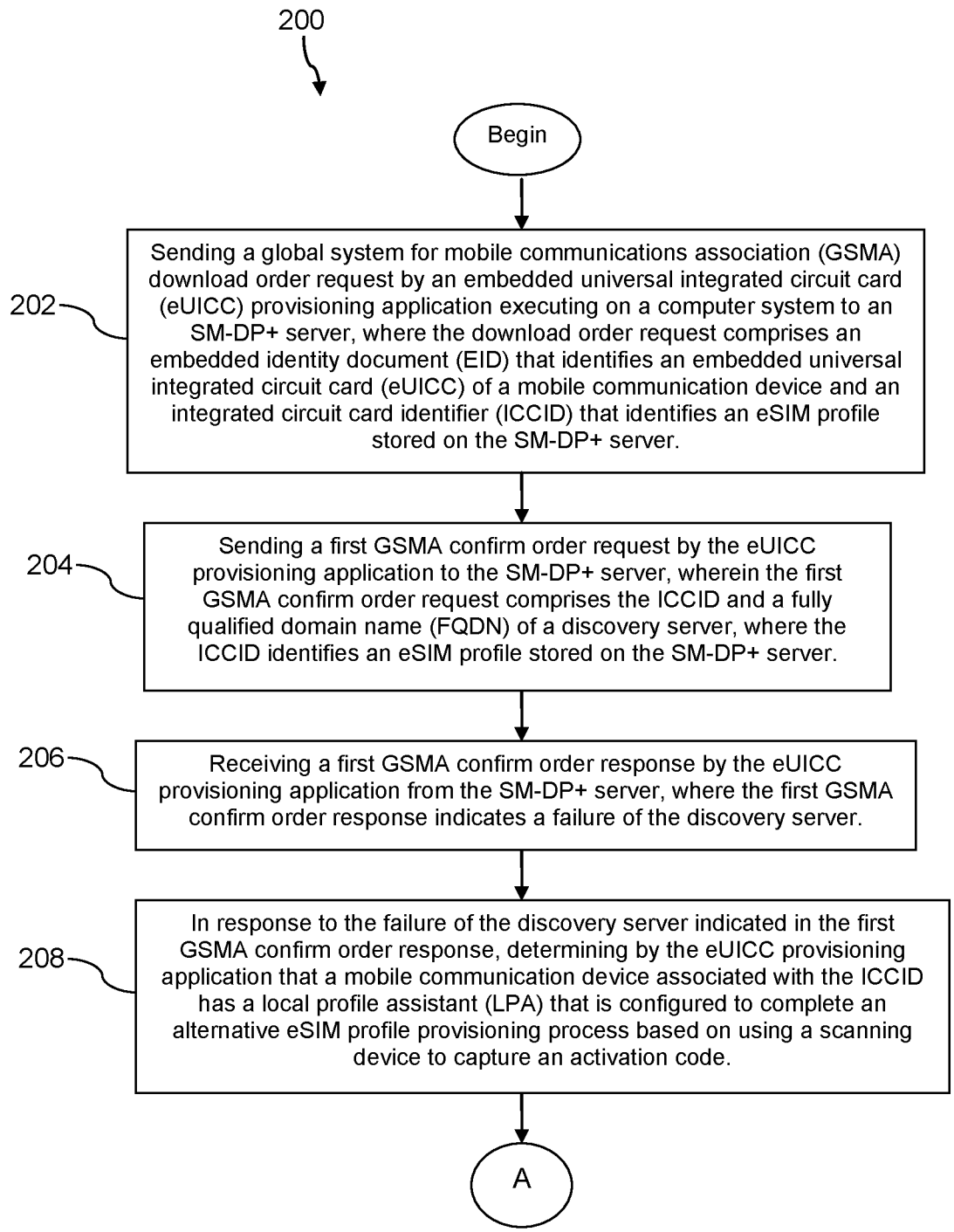
FIG. 3A and FIG. 3B are a flow chart of a method according to an embodiment of the disclosure.
Figure 3B:
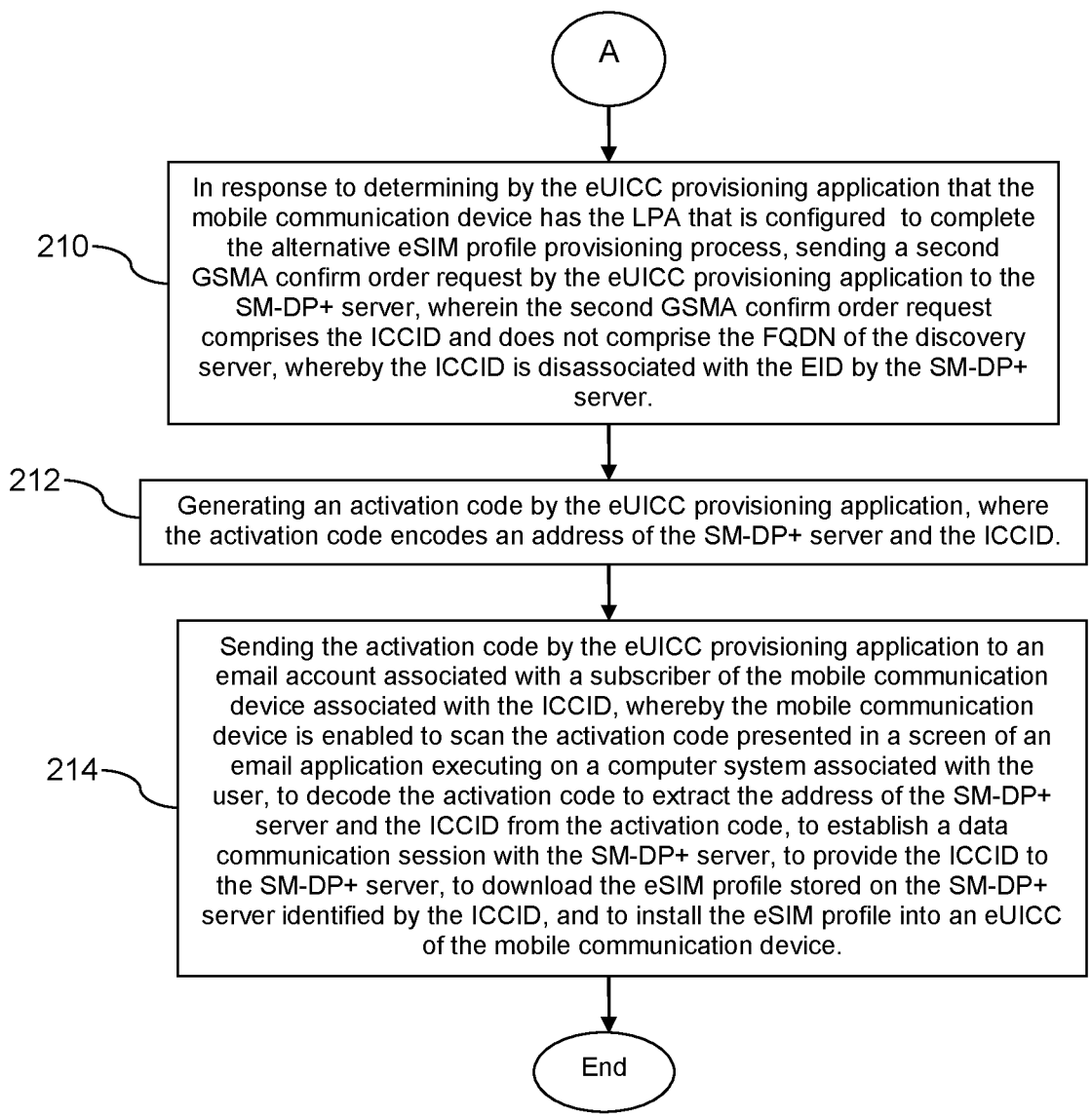

Turning now to FIG. 3A and FIG. 3B, a method 200 is described. In an embodiment, the 200 is a method of provisioning an embedded universal integrated circuit card (eUICC) of a mobile communication device. At block 202, the method 200 comprises sending a global system for mobile communications association (GSMA) download order request by an embedded universal integrated circuit card (eUICC) provisioning application executing on a computer system to an SM-DP+ server, where the download order request comprises an embedded identity document (EID) that identifies an embedded universal integrated circuit card (eUICC) of a mobile communication device and an integrated circuit card identifier (ICCID) that identifies an eSIM profile stored on the SM-DP+ server At block 204, the method 200 comprises sending a first GSMA confirm order request by the eUICC provisioning application to the SM-DP+ server, wherein the first GSMA confirm order request comprises the ICCID and a fully qualified domain name (FQDN) of a discovery server, where the ICCID identifies an eSIM profile stored on the SM-DP+ server. At block 206, the method 200 comprises receiving a first GSMA confirm order response by the eUICC provisioning application from the SM-DP+ server, where the first GSMA confirm order response indicates a failure of the discovery server.

At block 208 the method 200 comprises, in response to the failure of the discovery server indicated in the first GSMA confirm order response, determining by the eUICC provisioning application that a mobile communication device associated with the ICCID has a local profile assistant (LPA) that is configured to complete an alternative eSIM profile provisioning process based on using a scanning device to capture an activation code. At block 210, the method 200 comprises, in response to determining by the eUICC provisioning application that the mobile communication device has the LPA that is configured to complete the alternative eSIM profile provisioning process, sending a second GSMA confirm order request by the eUICC provisioning application to the SM-DP+ server, wherein the second GSMA confirm order request comprises the ICCID and does not comprise the EID of the eUICC of the mobile communication device, whereby the ICCID is disassociated with the EID by the SM-DP+ server.

At block 212, the method 200 comprises generating an activation code by the eUICC provisioning application, where the activation code encodes an address of the SM-DP+ server and the ICCID. At block 214, the method 200 comprises sending the activation code by the eUICC provisioning application to an email account associated with a subscriber of the mobile communication device associated with the ICCID, whereby the mobile communication device is enabled to scan the activation code presented in a screen of an email application executing on a computer system associated with the user, to decode the activation code to extract the address of the SM-DP+ server and the ICCID from the activation code, to establish a data communication session with the SM-DP+ server, to provide the ICCID to the SM-DP+ server, to download the eSIM profile stored on the SM-DP+ server identified by the ICCID, and to install the eSIM profile into an eUICC of the mobile communication device.

Figure 4:
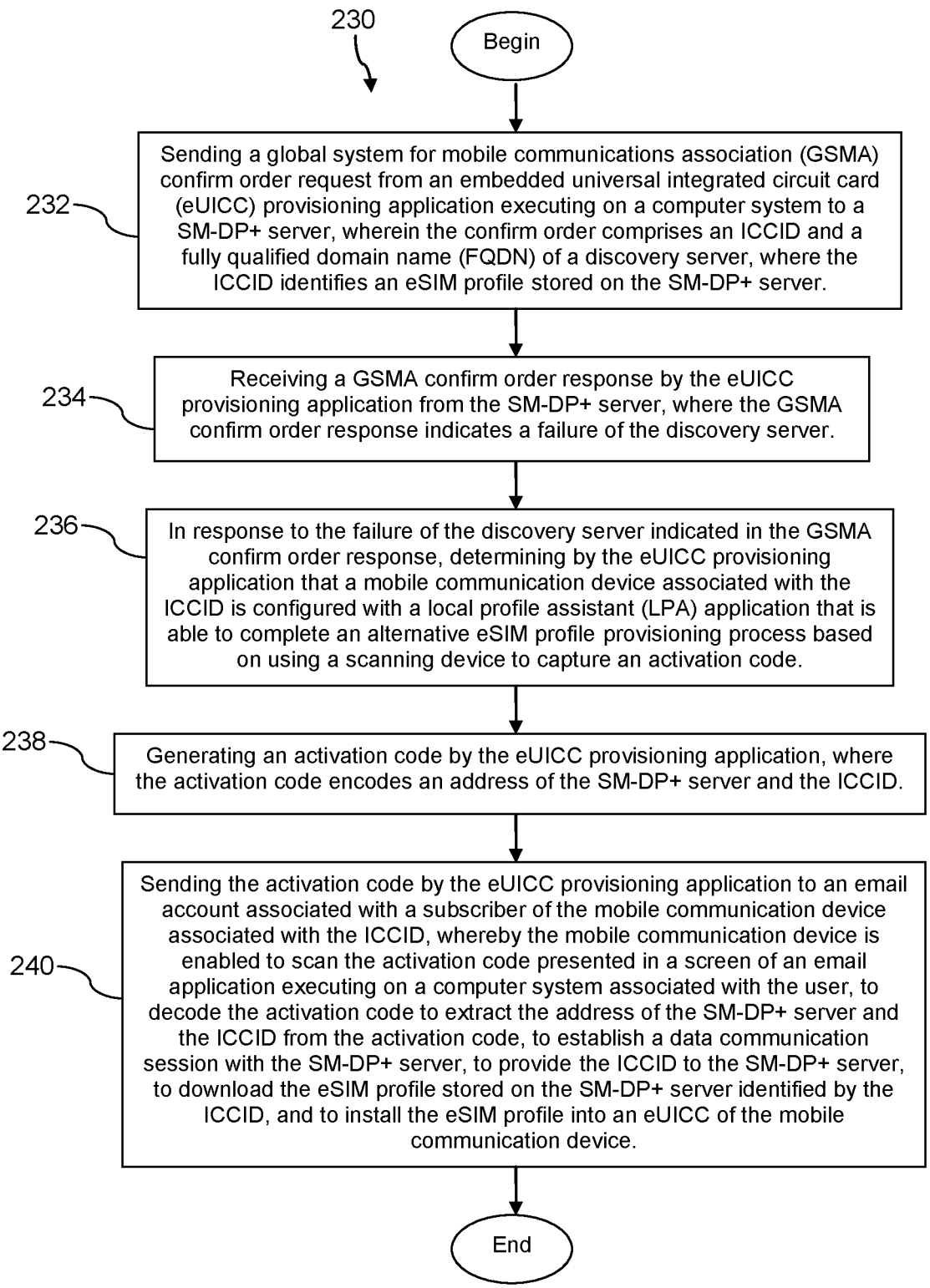
FIG. 4 is a flow chart of another method according to an embodiment of the disclosure.

Turning now to FIG. 4, a method 230 is described. In an embodiment, the method 230 is a method of provisioning an embedded universal integrated circuit card (eUICC) of a mobile communication device. At block 232, the method 230 comprises sending a global system for mobile communications association (GSMA) confirm order request from an embedded universal integrated circuit card (eUICC) provisioning application executing on a computer system to a SM-DP+ server, wherein the confirm order comprises an ICCID and a fully qualified domain name (FQDN) of a discovery server, where the ICCID identifies an eSIM profile stored on the SM-DP+ server.

At block 234, the method 230 comprises receiving a GSMA confirm order response by the eUICC provisioning application from the SM-DP+ server, where the GSMA confirm order response indicates a failure of the discovery server. At block 236, the method 230 comprises, in response to the failure of the discovery server indicated in the GSMA confirm order response, determining by the eUICC provisioning application that a mobile communication device associated with the ICCID is configured with a local profile assistant (LPA) application that is able to complete an alternative eSIM profile provisioning process based on using a scanning device to capture an activation code.

At block 238, the method 230 comprises generating an activation code by the eUICC provisioning application, where the activation code encodes an address of the SM-DP+ server and the ICCID. At block 240, the method 230 comprises sending the activation code by the eUICC provisioning application to an email account associated with a subscriber of the mobile communication device associated with the ICCID, whereby the mobile communication device is enabled to scan the activation code presented in a screen of an email application executing on a computer system associated with the user, to decode the activation code to extract the address of the SM-DP+ server and the ICCID from the activation code, to establish a data communication session with the SM-DP+ server, to provide the ICCID to the SM-DP+ server, to download the eSIM profile stored on the SM-DP+ server identified by the ICCID, and to install the eSIM profile into an eUICC of the mobile communication device.

Figure 5:
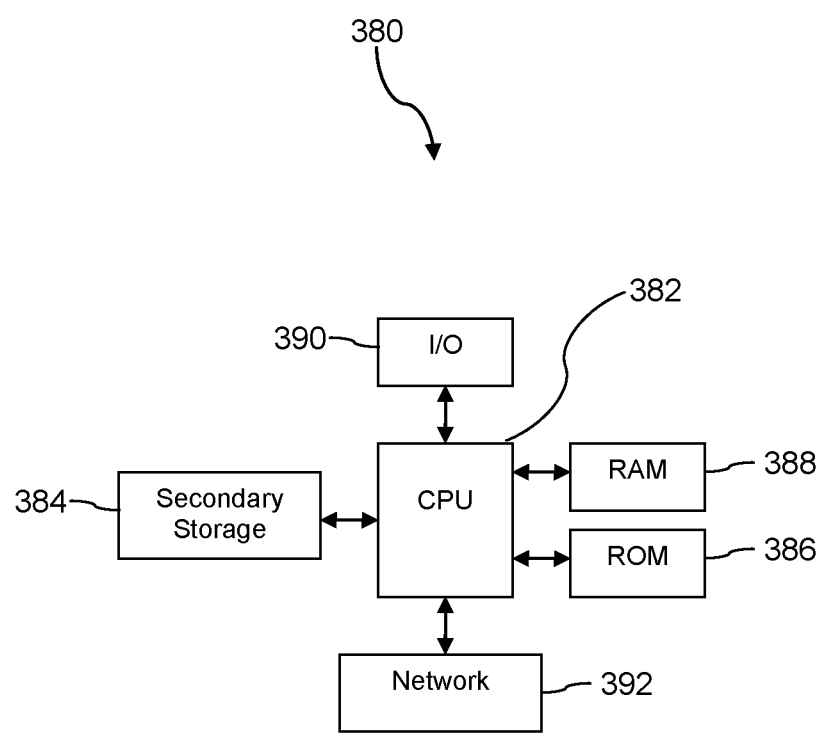
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of provisioning an embedded universal integrated circuit card (eUICC) of a mobile communication device, comprising:
    in response to a failure of a discovery server indicated in a global system for mobile communications association (GSMA) confirm order response from an SM-DP+ server, determining by an embedded universal integrated circuit card (eUICC) provisioning application executing on a computer system that a mobile communication device associated with an integrated circuit card identifier (ICCID) has a local profile assistant (LPA) that is configured to complete an alternative eSIM profile provisioning process based on using a scanning device to capture an activation code;
    in response to determining by the eUICC provisioning application that the mobile communication device has the LPA that is configured to complete the alternative eSIM profile provisioning process, sending a GSMA confirm order request by the eUICC provisioning application to the SM-DP+ server, wherein the GSMA confirm order request comprises the ICCID and does not comprise an embedded identity document (EID) of the eUICC of the mobile communication device, whereby the ICCID is disassociated with the EID by the SM-DP+ server;
    generating an activation code by the eUICC provisioning application, where the activation code encodes an address of the SM-DP+ server and the ICCID; and
    sending the activation code by the eUICC provisioning application to an email account associated with a subscriber of the mobile communication device associated with the ICCID, whereby the mobile communication device is enabled to scan the activation code presented in a screen of an email application executing on a computer system associated with a user, to decode the activation code to extract the address of the SM-DP+ server and the ICCID from the activation code, to establish a data communication session with the SM-DP+ server, to provide the ICCID to the SM-DP+ server, to download an eSIM profile stored on the SM-DP+ server identified by the ICCID, and to install the eSIM profile into an eUICC of the mobile communication device.

2. The method of claim 1, wherein the mobile communication device is a mobile phone, a cell phone, a smart phone, a personal digital assistant (PDA), a wearable computer, a headset computer, a laptop computer, a notebook computer, or a tablet computer.

3. The method of claim 1, wherein the eSIM profile comprises radio access network credentials associated with one of a 5G, a long term evolution (LTE), a code division multiple access (CDMA), or a global system for mobile communications (GSM) telecommunication protocol.

4. The method of claim 1, wherein the eSIM profile comprises a preferred roaming list (PRL).

5. The method of claim 1, wherein the eSIM profile comprises branding content and executable applications.

6. The method of claim 1, wherein the activation code is an encrypted message.

7. The method of claim 1, wherein the activation code is a 2-dimensional barcode.

8. A computer system, comprising:
    a processor;
    a non-transitory memory; and
    an embedded universal integrate circuit card (eUICC) provisioning application stored in the non-transitory memory that, when executed by the processor:
        in response to a failure of a discovery server indicated in a global system for mobile communications association (GSMA) confirm order response from an SM-DP+ server, determines that a mobile communication device associated with an integrated circuit card identifier (ICCID) is configured with a local profile assistant (LPA) application that is able to complete an alternative eSIM profile provisioning process based on using a scanning device to capture an activation code,
        generates an activation code that encodes an address of the SM-DP+ server and the ICCID, and
        sends the activation code to an email account associated with a subscriber of the mobile communication device associated with the ICCID, whereby the mobile communication device is enabled to scan the activation code presented in a screen of an email application executing on a computer system associated with a user, to decode the activation code to extract the address of the SM-DP+ server and the ICCID from the activation code, to establish a data communication session with the SM-DP+ server, to provide the ICCID to the SM-DP+ server, to download an eSIM profile stored on the SM-DP+ server identified by the ICCID, and to install the eSIM profile into an eUICC of the mobile communication device.

9. The method of claim 8, wherein the activation code is a 2-dimensional barcode.

10. The method of claim 8, wherein the activation code is an encrypted message.

11. The method of claim 8, wherein the address of the SM-DP+ server is an internet protocol (IP) address.

12. The method of claim 8, wherein the address of the SM-DP+ server is a uniform resource locator (URL).

13. The method of claim 8, wherein the mobile communication device is a mobile phone, a cell phone, a smart phone, a personal digital assistant (PDA), a wearable computer, a headset computer, a laptop computer, a notebook computer, or a tablet computer.

14. The method of claim 8, wherein the eSIM profile comprises radio access network access keys, a preferred roaming list (PRL), branding information, or executable applications.

15. A method of provisioning an embedded universal integrated circuit card (eUICC) of a mobile communication device, comprising:

in response to a failure of the discovery server indicated in a global system for mobile communications association (GSMA) confirm order response from an SM-DP+ server, determining by an embedded universal integrated circuit card (eUICC) provisioning application that a mobile communication device associated with an integrated circuit card identifier (ICCID) is configured with a local profile assistant (LPA) application that is able to complete an alternative eSIM profile provisioning process based on using a scanning device to capture an activation code;

generating an activation code by the eUICC provisioning application, where the activation code encodes an address of the SM-DP+ server and the ICCID; and sending the activation code by the eUICC provisioning application to an email account associated with a subscriber of the mobile communication device associated with the ICCID, whereby the mobile communication device is enabled to scan the activation code presented in a screen of an email application executing on a computer system associated with a user, to decode the activation code to extract the address of the SM-DP+ server and the ICCID from the activation code, to establish a data communication session with the SM-DP+ server, to provide the ICCID to the SM-DP+ server, to download an eSIM profile stored on the SM-DP+ server identified by the ICCID, and to install the eSIM profile into an eUICC of the mobile communication device.

16. The method of claim 15, wherein the mobile communication device is a mobile phone, a cell phone, a smart phone, a personal digital assistant (PDA), a wearable computer, a headset computer, a laptop computer, a notebook computer, or a tablet computer.

17. The method of claim 15, wherein the eSIM profile comprises a preferred roaming list (PRL).

18. The method of claim 15, wherein the eSIM profile comprises branding content and executable applications.

19. The method of claim 18, wherein the branding content comprises at least one of ring tones and a mobile network operator logo.

20. The method of claim 15, wherein the activation code is one of a 2-dimensional barcode or an encrypted message.

* * * * *